(12) United States Patent
Wang et al.

(10) Patent No.: US 11,071,146 B2
(45) Date of Patent: Jul. 20, 2021

(54) COMMUNICATION METHOD, TERMINAL DEVICE, AND NETWORK DEVICE

(71) Applicant: Huawei Technologies Co., Ltd., Shenzhen (CN)

(72) Inventors: Tingting Wang, Shenzhen (CN); Qinghai Zeng, Shanghai (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/503,206

(22) Filed: Jul. 3, 2019

(65) Prior Publication Data
US 2019/0373644 A1  Dec. 5, 2019

Related U.S. Application Data

(63) Continuation of application No. PCT/CN2017/119086, filed on Dec. 27, 2017.

(30) Foreign Application Priority Data

Jan. 4, 2017 (CN) .......................... 201710005557.8

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0007* (2013.01); *H04W 28/0205* (2013.01);
(Continued)

(58) Field of Classification Search
None
See application file for complete search history.

(56) References Cited

U.S. PATENT DOCUMENTS

| 9,735,863 B2 | 8/2017 | Cvijetic et al. |
| 2012/0163305 A1 | 6/2012 | Nimbalker et al. |

(Continued)

FOREIGN PATENT DOCUMENTS

| CN | 1463097 A | 12/2003 |
| CN | 101296024 A | 10/2008 |

(Continued)

OTHER PUBLICATIONS

"WF on Waveform for NR Uplink," 3GPP TSG RAN WG1 #86-Bis, Lisbon, Portugal, R1-1610485, pp. 1-6, 3rd Generation Partnership Project, Valbonne, France (Oct. 10-14, 2016).

(Continued)

*Primary Examiner* — Scott M Sciacca
(74) *Attorney, Agent, or Firm* — Leydig, Voit & Mayer, Ltd.

(57) ABSTRACT

A communication method performed by a terminal device is described. The method includes receiving a notification message from a network device. The notification message carries a target manner of an uplink waveform. The method further includes determining the target manner of an uplink waveform, and thereafter sending a message 3 with the target manner of the uplink waveform to the network device to perform an initial random access.

18 Claims, 5 Drawing Sheets

(51) Int. Cl.
*H04W 76/00* (2018.01)
*H04L 5/00* (2006.01)
*H04W 76/27* (2018.01)
*H04W 28/02* (2009.01)
*H04L 27/26* (2006.01)
*H04W 92/10* (2009.01)

(52) U.S. Cl.
CPC .......... *H04W 72/04* (2013.01); *H04W 76/27* (2018.02); *H04L 27/2607* (2013.01); *H04W 92/10* (2013.01)

(56) References Cited

U.S. PATENT DOCUMENTS

| | | |
|---|---|---|
| 2014/0022981 A1 | 1/2014 | Kim et al. |
| 2015/0092759 A1 | 4/2015 | Cvijetic et al. |
| 2015/0208386 A1 | 7/2015 | Yang et al. |
| 2017/0331608 A1 | 11/2017 | Luo et al. |
| 2017/0366298 A1 | 12/2017 | Xu et al. |
| 2018/0049233 A1* | 2/2018 | Luo ............... H04L 27/2623 |
| 2018/0116000 A1* | 4/2018 | Ly ............... H04W 74/006 |
| 2018/0132282 A1* | 5/2018 | Ly ............... H04W 8/245 |
| 2018/0139785 A1* | 5/2018 | Zhang ............... H04L 5/0007 |
| 2018/0176949 A1* | 6/2018 | Islam ............... H04W 52/146 |
| 2019/0182812 A1* | 6/2019 | Shimezawa ........ H04W 72/042 |
| 2019/0253122 A1* | 8/2019 | Yang ............... H04B 7/0639 |
| 2019/0296954 A1* | 9/2019 | Xing ............... H04L 27/2627 |
| 2019/0297619 A1* | 9/2019 | Liu ............... H04W 72/042 |

FOREIGN PATENT DOCUMENTS

| | | |
|---|---|---|
| CN | 101489258 A | 7/2009 |
| CN | 101500308 A | 8/2009 |
| CN | 101668328 A | 3/2010 |
| CN | 102150387 A | 8/2011 |
| CN | 103188759 A | 7/2013 |
| CN | 103283283 A | 9/2013 |
| CN | 103944855 A | 7/2014 |
| CN | 104105135 A | 10/2014 |
| CN | 104509157 A | 4/2015 |
| JP | 2019528611 A | 10/2019 |
| WO | 2018085701 A1 | 5/2018 |
| WO | 2018087124 A1 | 5/2018 |

OTHER PUBLICATIONS

"NR RACH Procedure," 3GPP TSG RAN WG1 Meeting #87, Reno, USA, R1-1611375, XP051175356, pp. 1-4, 3rd Generation Partnership Project, Valbonne, France (Nov. 14-18, 2016).

"Discussion on UE behavior on mixed numerology carrier," 3GPP TSG RAN WG1 Meeting #86bis, Lisbon, Portugal, R1-1609425, XP051159502, pp. 1-4, 3rd Generation Partnership Project, Valbonne, France (Oct. 10-14, 2016).

"On numerology determination during initial access,"3GPP TSG RAN WG1 Meeting #87, Reno, USA, R1-1611651, XP051190057, pp. 1-3, 3rd Generation Partnership Project, Valbonne, France (Nov. 14-18, 2016).

CN/201710005557, Office Action, dated Nov. 27, 2020.

"User Multiplexing of DFTs-OFDM and OFDM in uplink," 3GPP TSG-RAN WG1 #86, Lisbon, Portugal, R1-1610114, pp. 1-5, 3rd Generation Partnership Project, Valbonne, France (Oct. 10-14, 2016).

* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2017/119086, filed on Dec. 27, 2017, which claims priority to Chinese Patent Application No. 201710005557.8 filed on Jan. 4, 2017, all of the aforementioned patent applications are hereby incorporated by reference in their entireties.

TECHNICAL FIELD

Embodiments of this application relate to the communications field, and more specifically, to a communication method, a terminal device, and a network device.

BACKGROUND

In Long Term Evolution (LTE) technologies, various air interface technologies (e.g. a random access manner, an uplink waveform, an uplink multiple access manner, a modulation scheme, and a duplexing manner) all use one or more determined manners. It is defined in a communications protocol that for an air interface technology, a particular manner is always used or a particular manner is used under a specified condition.

In an existing LTE system, because most air interface technologies use only a fixed manner, for example, a transmission time interval (TTI length) has only one manner of 1 ms, when a terminal device initially accesses a network device, the terminal device accesses the system in a manner defined in the protocol. However, in a 5G system, each air interface technology may use a plurality of optional manners, and the possible manners may respectively have use conditions.

Therefore, a technical means is urgently needed to select, from a plurality of optional manners of the air interface technology based on an actual situation, a manner that is of the air interface technology and that is used during actual communication between a terminal device and a network device.

SUMMARY

Embodiments of this application provide a communication method, to determine, from a plurality of optional manners of an air interface technology, a target manner of the air interface technology used during actual communication.

According to a first aspect, a communication method is provided, including: determining, by a terminal device, at least one target manner of an air interface technology; and communicating, by the terminal device, with the network device by using the at least one target manner of the air interface technology.

Therefore, according to the method provided in this embodiment of this application, a target manner that is of an air interface technology and that is used during actual communication can be determined from a plurality of optional manners of the air interface technology.

With reference to the first aspect, in a first possible implementation of the first aspect, the determining, by a terminal device, at least one target manner of an air interface technology includes: receiving, by the terminal device, a notification message sent by the network device, where the notification message carries the at least one target manner of the air interface technology, and the at least one target manner of the air interface technology is determined by the network device from at least one optional manner of the air interface technology.

Therefore, the terminal device can determine, from a plurality of optional manners of the air interface technology based on the notification message sent by the network device, the target manner that is of the air interface technology and that is used during actual communication, and can flexibly use a more appropriate manner of the air interface technology based on an actual communication situation, to adapt to different communication scenarios.

With reference to the first aspect and the foregoing implementation of the first aspect, in a second possible implementation of the first aspect, the notification message is a system information sent by the network device, and the communicating with the network device by using the at least one target manner of the air interface technology includes: initially and randomly accessing the network device by using the at least one target manner of the air interface technology.

Therefore, the terminal device can determine, from a plurality of optional manners of the air interface technology based on the notification message sent by the network device, a target manner that is of the air interface technology and that is used during initial random access to a system, and can flexibly use a more appropriate manner of the air interface technology based on an actual communication situation, to adapt to different communication scenarios.

With reference to the first aspect and the foregoing implementation of the first aspect, in a third possible implementation of the first aspect, the notification message is a message 2 of the initial random access, and the communicating with the network device by using the at least one target manner of the air interface technology includes: sending message 3 of the initial random access to the network device by using the at least one target manner of the air interface technology.

Therefore, the terminal device can determine, from the plurality of optional manners of the interface technology based on the message 2 sent by the network device, the target manner that is of the air interface technology and that is used by the message 3 of the initial random access. The terminal device may determine a to-be-used target manner of the air interface technology based on an indication of the network device, to better adapt to an actual network status.

With reference to the first aspect and the foregoing implementation of the first aspect, in a fourth possible implementation of the first aspect, the message 2 of the initial random access carries the at least one target manner of the air interface technology, the at least one target manner of the air interface technology includes a target manner of an uplink waveform, and the sending the message 3 of the initial random access to the network device by using the at least one target manner of the air interface technology includes: determining a resource block allocation RB allocation field content value in the initial random access message 2; determining a resource location of the message 3 of the initial random access depending on whether the target manner of the uplink waveform is discrete Fourier transform spread orthogonal frequency division multiplexing (DFT-S-OFDM) or cyclic prefix orthogonal frequency division multiplexing (CP-OFDM), where a resource location of the message 3 of the initial random access that is determined when the target manner of the uplink waveform is the DFT-S-OFDM is different from a resource location of the message 3 of the initial random access that is determined when the target manner of the uplink waveform is the CP-OFDM; and sending the message 3 of the initial random access to the network device at the determined resource location.

With reference to the first aspect and the foregoing implementation of the first aspect, in a fifth possible implementation of the first aspect, the network device is a target network device to which the terminal device expects to be handed over, and the notification message is a handover command (HO command).

It should be understood that, when the terminal device is handed over from a source network device to the target network device, the terminal device learns, based on the HO command sent by the target network device, at least one target manner that is of the air interface technology and that is to be used in subsequent communication.

Therefore, the terminal device can determine, from the plurality of optional manners of the air interface technology based on the notification message sent by the network device, a target manner that is of the air interface technology and that is used during handover to the network device, and can flexibly use a more appropriate manner of the air interface technology based on an actual communication situation, to adapt to different communication scenarios.

With reference to the first aspect and the foregoing implementation of the first aspect, in a sixth possible implementation of the first aspect, after the terminal device initially accesses the network device, the notification message is one of the following messages: a physical layer message, a media access control MAC message, or a radio resource control RRC message.

With reference to the first aspect and the foregoing implementation of the first aspect, in a seventh possible implementation of the first aspect, the determining, by a terminal device, at least one target manner of an air interface technology includes: selecting, by the terminal device, the at least one target manner of the air interface technology from the at least one optional manner of the air interface technology according to an air interface technology selection policy.

Optionally, the terminal device may determine the air interface technology selection policy according to a communications protocol stipulation. The terminal device can determine the at least one target manner of the air interface technology from the at least one optional manner of the air interface technology according to the air interface technology selection policy.

Therefore, the terminal device can determine, from the plurality of optional manners of the air interface technology according to the air interface technology selection policy, the target manner that is of the air interface technology and that is used during communication with the network device. In other words, a more appropriate manner of the air interface technology can be flexibly used based on an actual communication situation, to adapt to different communication scenarios.

With reference to the first aspect and the foregoing implementation of the first aspect, in an eighth possible implementation of the first aspect, the method further includes: receiving a system information sent by the network device, where the system information carries the air interface technology selection policy.

To be specific, the network device may send, to the terminal device, the system information carrying the air interface technology selection policy, to instruct UE to determine, from the plurality of optional manners of the air interface technology, the target manner that is of the air interface technology and that is used during communication with the network device.

With reference to the first aspect and the foregoing implementation of the first aspect, in a ninth possible implementation of the first aspect, the communicating with the network device by using the at least one target manner of the air interface technology includes: sending a selection notification message to the network device, where the selection notification message is used to indicate that the terminal device is to communicate with the network device by using the at least one target manner of the air interface technology.

To be specific, after determining the target manner that is of the air interface technology and that is used during communication with the network device, the terminal device needs to notify the network device of the to-be-used target manner of the air interface technology.

With reference to the first aspect and the foregoing implementations of the first aspect, in a tenth possible implementation of the first aspect, the at least one target manner of the air interface technology includes at least one of the following manners for the following various air interface technologies. When the air interface technology is a random access manner, the target manner is one of the following: a random access manner of a Long Term Evolution (LTE) system or a simple random access manner. When the air interface technology is an uplink waveform, the target manner is one of the following: a cyclic prefix orthogonal frequency division multiplexing (CP-OFDM) manner or a discrete Fourier transform spread orthogonal frequency division multiplexing (DFT-S-OFDM) manner. When the air interface technology is an uplink multiple access manner, the target manner is one of the following: a sparse code multiple access SCMA manner, a multi-user shared access (MUSA) manner, a low code rate spreading manner, a frequency domain spreading manner, a non-orthogonal coded multiple access (NCMA) manner, a non-orthogonal multiple access (NOMA) manner, a pattern division multiple access (PDMA) manner, a resource spread multiple access (RSMA) manner, an interleave-grid multiple access (IGMA) manner, a low density spreading with signature vector extension (LDS-SVE) manner, a low code rate and signature based shared access (LSSA) manner, a non-orthogonal coded access (NOCA) manner, an interleave division multiple access (IDMA) manner, a repetition division multiple access (RDMA) manner, or a group orthogonal coded access (GOCA) manner. When the air interface technology is a modulation scheme, the target manner is one of the following: a quadrature phase shift keying (QPSK) scheme, a 16 quadrature amplitude modulation (16QAM) scheme, a 64 quadrature amplitude modulation (64QAM) scheme, a 256 quadrature amplitude modulation (256QAM) scheme, a constellation mapping among subcarriers scheme, a non-uniform quadrature amplitude modulation (QAM) scheme, higher order modulation in conjunction with MIMO higher order modulation in conjunction with MIMO, a coded modulation scheme, a spatial modulation scheme, a scheme of mappings of bits to symbols rotated-quadrature amplitude modulation up to binary phase shift keying (BPSK) mappings of bits to symbol(s) rotated-QAM up to BPSK, a scheme of mappings of bits to symbols rotated-quadrature amplitude modulation up to quadrature phase shift keying (QPSK) mappings of bits to symbol(s) rotated-QAM up to QPSK, or a constellation interpolation. When the air interface technology is a duplexing manner, the target manner is one of the following: a frequency division duplex (FDD) manner, a time division duplex (TDD) manner, a dynamic time division duplex (TDD) manner, a flexible duplex manner, a space division full-duplex manner, or an in-band full-duplex manner. When the air interface technology is an enhanced mobile broadband (eMBB) service uplink control channel coding manner, the target manner is one of the following: a polar code coding manner, a repetition coding manner, or a block coding manner. When the air interface technology is an inactive uplink data transmission manner, the target manner is one of the following: a grant-free transmission manner or a 2-step random access channel (2-step RACH) manner. When the air interface technology is a subcarrier spacing, the target manner is one of the following: 15 kHz*$2^n$, where n is an integer. When the air interface technology is a slot type, the target manner is one of the following cases in which slot duration is 7 orthogonal frequency division multiplex OFDM symbols or 14 orthogonal frequency division multiplex OFDM symbols, or mini-slot duration is m OFDM symbols, where m∈[1,6] When the air interface technology is a transmission TTI length, the target manner is one of the following: {a downlink short TTI length: 2 OFDM symbols, an uplink short TTI length: 2 OFDM symbols}, {a downlink short TTI length: 2 OFDM symbols, an uplink short TTI length: 4 OFDM symbols}, {a downlink short TTI length: 2 OFDM symbols, an uplink short TTI length: 7 OFDM symbols}, {a downlink short TTI length: 7 OFDM symbols, an uplink short TTI length: 7 OFDM symbols}, {a downlink short TTI length: 2 OFDM symbols, an uplink short TTI length: 14 OFDM symbols}, or {a downlink short TTI length: 7 OFDM symbols, an uplink short TTI length: 14 OFDM symbols}.

According to a second aspect, a communication method is provided, including: determining, by a network device, at least one target manner of an air interface technology; and communicating, by the network device, with a terminal device by using the at least one target manner of the air interface technology.

Therefore, according to the method provided in this embodiment of this application, the target manner that is of the air interface technology and that is used during actual communication can be determined from the plurality of optional manners of the air interface technology.

With reference to the second aspect, in a first possible implementation of the second aspect, the determining, by a network device, at least one target manner of an air interface technology includes: determining, by the network device, the at least one target manner of the air interface technology from at least one optional manner of the air interface technology; and sending, by the network device, a notification message to the terminal device, where the notification message carries the at least one target manner of the air interface technology.

With reference to the second aspect, in a second possible implementation of the second aspect, the notification message is a system information, so that the terminal device initially and randomly accesses the network device by using the at least one target manner of the air interface technology.

With reference to the second aspect, in a third possible implementation of the second aspect, the notification message is message 2 of an initial random access, so that the terminal device sends message 3 of the initial random access to the network device based on the at least one target manner of the air interface technology.

With reference to the second aspect, in a fourth possible implementation of the second aspect, the network device is a target network device to which the terminal device expects to be handed over, and the notification message is an HO command message.

With reference to the second aspect, in a fifth possible implementation of the second aspect, after the terminal device accesses the network device, the notification message is one of the following messages: a physical layer message, a media access control MAC message, or a radio resource control RRC message.

With reference to the second aspect, in a sixth possible implementation of the second aspect, the at least one target manner of the air interface technology includes at least one of the following optional manners for the following various air interface technologies. When the air interface technology is a random access manner, the target manner is one of the following: a random access manner of a Long Term Evolution (LTE) system or a simple random access manner. When the air interface technology is an uplink waveform, the target manner is one of the following: a cyclic prefix orthogonal frequency division multiplexing (CP-OFDM) manner or a discrete Fourier transform spread orthogonal frequency division multiplexing (DFT-S-OFDM) manner. When the air interface technology is an uplink multiple access manner, the target manner is one of the following: a sparse code multiple access (SCMA) manner, a multi-user shared access (MUSA) manner, a low code rate spreading manner, a frequency domain spreading manner, a non-orthogonal coded multiple access (NCMA) manner, a non-orthogonal multiple access (NOMA) manner, a pattern division multiple access (PDMA) manner, a resource spread multiple access (RSMA) manner, an interleave-grid multiple access (IGMA) manner, a low density spreading with signature vector extension (LDS-SVE) manner, a low code rate and signature based shared access (LSSA) manner, a non-orthogonal coded access (NOCA) manner, an interleave division multiple access (IDMA) manner, a repetition division multiple access (RDMA) manner, or a group orthogonal coded access (GOCA) manner. When the air interface technology is a modulation scheme, the target manner is one of the following: a quadrature phase shift keying (QPSK) scheme, a 16 quadrature amplitude modulation (16QAM) scheme, a 64 quadrature amplitude modulation (64QAM) scheme, a 256 quadrature amplitude modulation (256QAM) scheme, a constellation mapping among subcarriers scheme, a non-uniform quadrature amplitude modulation (QAM) scheme, a higher order modulation in conjunction with MIMO higher order modulation in conjunction with MIMO, a coded modulation scheme, a spatial modulation scheme, a scheme of mappings of bits to symbols rotated-quadrature amplitude modulation up to binary phase shift keying, a scheme of mappings of bits to symbols rotated-quadrature amplitude modulation up to quadrature phase shift keying, or constellation interpolation constellation interpolation. When the air interface technology is a duplexing manner, the target manner is one of the following: a frequency division duplex (FDD) manner, a time division duplex (TDD) manner, a dynamic time division duplex (TDD) manner, a flexible duplex manner, a space division full-duplex manner, or an in-band full-duplex manner. When the air interface technology is an enhanced mobile broadband (eMBB) service uplink control channel coding manner, the target manner is one of the following: a polar code coding manner, a repetition coding manner, or a block coding manner. When the air interface technology is an inactive uplink data transmission manner, the target manner is one of the following: a grant-free transmission manner or a 2-step random access channel manner (2-step RACH) manner. When the air interface technology is a subcarrier spacing, the target manner is one of the following: 15 kHz*$2^n$, where n is an integer. When the air interface technology is a slot type, the target manner is one of the following cases in which slot duration is 7 orthogonal frequency division multiplex (OFDM) symbols or 14 orthogonal frequency division multiplex (OFDM) symbols, or mini-slot duration is m OFDM symbols, where m∈{1,6} When the air interface technology is a transmission TTI length, the target manner is one of the following: {a downlink short TTI length: 2 OFDM symbols, an uplink short TTI length: 2 OFDM symbols}, {a downlink short TTI length: 2 OFDM symbols, an uplink short TTI length: 4 OFDM symbols}, {a downlink short TTI length: 2 OFDM symbols, an uplink short TTI length: 7 OFDM symbols}, {a downlink short TTI length: 7 OFDM symbols, an uplink short TTI length: 7 OFDM symbols}, {a downlink short TTI length: 2 OFDM symbols, an uplink short TTI length: 14 OFDM symbols}, or {a downlink short TTI length: 7 OFDM symbols, an uplink short TTI length: 14 OFDM symbols}.

Therefore, the network device determines, from the plurality of optional manners of the air interface technology, the target manner that is of the air interface technology and that is used during communication with the terminal device. In other words, a more appropriate manner of the air interface technology can be flexibly used based on an actual communication situation, to adapt to different communication scenarios.

According to a third aspect, a terminal device is provided. The terminal device is configured to implement the method in the first aspect or any possible implementation of the first aspect. Specifically, the terminal device includes a unit for performing the method in the first aspect or any possible implementation of the first aspect.

According to a fourth aspect, a network device is provided. The network device is configured to implement the method in the second aspect or any possible implementation of the second aspect. Specifically, the network device includes a unit for performing the method in the second aspect or any possible implementation of the second aspect.

According to a fifth aspect, a terminal device is provided. The terminal device includes: a transceiver, a memory, a processor, and a bus system. The transceiver, the memory, and the processor are connected by using the bus system. The memory is configured to store an instruction. The processor is configured to execute the instruction stored in the memory, to control the transceiver to receive and/or send a signal. In addition, when the processor executes the instruction stored in the memory, the execution enables the processor to perform the method in the first aspect or any possible implementation of the first aspect.

According to a sixth aspect, a network device is provided. The network device includes: a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when the processor executes the instruction stored in the memory, the execution enables the processor to perform the method in the second aspect or any possible implementation of the second aspect.

According to a seventh aspect, a computer readable medium is provided. The computer readable medium is configured to store a computer program. The computer program includes an instruction for performing the method in the first aspect or any possible implementation of the first aspect.

According to an eighth aspect, a computer readable medium is provided. The computer readable medium is configured to store a computer program. The computer program includes an instruction for performing the method in the second aspect or any possible implementation of the second aspect.

DESCRIPTION OF EMBODIMENTS

The following describes the technical solutions in the embodiments of this application with reference to the accompanying drawings.

In the embodiments of this application, a terminal device may be user equipment (UE), an access terminal, a subscriber unit, a subscriber station, a mobile station, a mobile console, a remote station, a remote terminal, a mobile device, a user terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

Further, in the embodiments of this application, a base station may be a network device for communication with the terminal device. For example, the base station may be a base transceiver station (BTS) in a GSM system or CDMA, or may be a NodeB (NB) in a WCDMA system, or may be an evolved NodeB (eNB or eNodeB) in an LTE system.

Alternatively, the base station may be a relay station, an access point, an in-vehicle device, a wearable device, a network-side device in a future 5G network, or the like.

Figure 1:
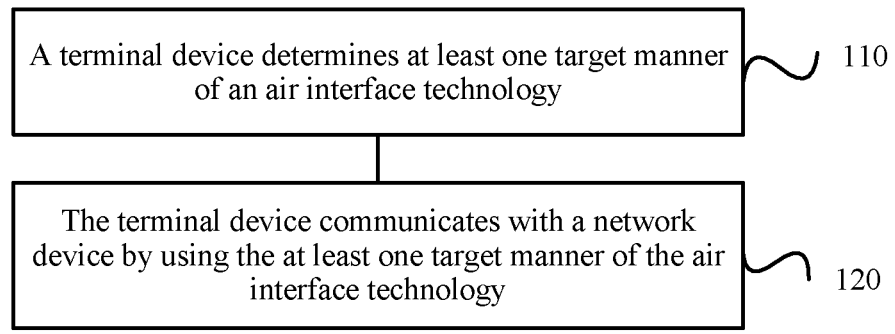
FIG. 1 is a schematic flowchart of a method according to an embodiment of this application.

FIG. 1 is a schematic flowchart of a method according to an embodiment of this application. As shown in FIG. 1, the method 100 is performed by a terminal device. As shown in FIG. 1, the method 100 includes the following steps.

Step 110. During 110, the terminal device determines at least one target manner of an air interface technology.

Step 120. During 120, the terminal device communicates with a network device by using the at least one target manner of the air interface technology.

It should be understood that each air interface technology may have more than one optional manner, and one target manner of the air interface technology needs to be selected for network communication during actual communication. Therefore, the terminal device needs to determine the target manner of the air interface technology.

Optionally, in an embodiment of this application, the at least one target manner of the air interface technology includes at least one of the following optional manners for the following various air interface technologies. When the air interface technology is a random access manner, the target manner is one of the following: a random access manner of a long term evolution (LTE) system or a simple random access manner. When the air interface technology is an uplink waveform, the target manner is one of the following: a cyclic prefix orthogonal frequency division multiplexing (CP-OFDM) manner or a discrete Fourier transform spread orthogonal frequency division multiplexing (DFT-S-OFDM) manner. When the air interface technology is an uplink multiple access manner, the target manner is one of the following: a sparse code multiple access (SCMA) manner, a multi-user shared access (MUSA) manner, a low code rate spreading manner, a frequency domain spreading manner, a non-orthogonal coded multiple access (NCMA) manner, a non-orthogonal multiple access (NOMA) manner, a pattern division multiple access (PDMA) manner, a resource spread multiple access (RSMA) manner, an interleave-grid multiple access (IGMA) manner, a low density spreading with signature vector extension (LDS-SVE) manner, a low code rate and signature based shared access (LSSA) manner, a non-orthogonal coded access (NOCA) manner, an interleave division multiple access (IDMA) manner, a repetition division multiple access (RDMA) manner, or a group orthogonal coded access (GOCA) manner. When the air interface technology is a modulation scheme, the target manner is one of the following: a quadrature phase shift keying (QPSK) scheme, a 16 quadrature amplitude modulation 16 (QAM) scheme, a 64 quadrature amplitude modulation 64QAM scheme, a 256 quadrature amplitude modulation 256QAM scheme, a constellation mapping among subcarriers scheme, a non-uniform quadrature amplitude modulation (non-uniform QAM) scheme, a higher order modulation in conjunction with MIMO, a coded modulation scheme, a spatial modulation scheme, a scheme of mappings of bits to symbols rotated-quadrature amplitude modulation up to quadrature phase shift keying (mappings of bits to symbol(s) rotated-QAM up to QPSK), or constellation interpolation. When the air interface technology is a duplexing manner, the target manner is one of the following: a frequency division duplex (FDD) manner, a time division duplex (TDD) manner, a dynamic time division duplex (dynamic TDD) manner, a flexible duplex manner, a space division full-duplex manner, or an in-band full-duplex manner. When the air interface technology is an enhanced mobile broadband (eMBB) service uplink control channel coding manner, the target manner is one of the following: a polar code coding manner, a repetition coding manner, or a block coding manner. When the air interface technology is an inactive uplink data transmission manner, the target manner is one of the following: a grant-free transmission manner or a 2-step random access 2-step RACH manner. When the air interface technology is a subcarrier spacing, the target manner is one of the following: $15 \text{ kHz}*2^n$, where n is an integer. When the air interface technology is a slot type, the target manner is one of the following cases in which slot duration is 7 orthogonal frequency division multiplex (OFDM) symbols or 14 orthogonal frequency division multiplex (OFDM) symbols, or mini-slot duration is m OFDM symbols, where m∈{1,6} When the air interface technology is a transmission TTI length, the target manner is one of the following: {a downlink short TTI length: 2 OFDM symbols, an uplink short TTI length: 2 OFDM symbols}, {a downlink short TTI length: 2 OFDM symbols, an uplink short TTI length: 4 OFDM symbols}, {a downlink short TTI length: 2 OFDM symbols, an uplink short TTI length: 7 OFDM symbols}, {a downlink short TTI length: 7 OFDM symbols, an uplink short TTI length: 7 OFDM symbols}, {a downlink short TTI length: 2 OFDM symbols, an uplink short TTI length: 14 OFDM symbols}, or {a downlink short TTI length: 7 OFDM symbols, an uplink short TTI length: 14 OFDM symbols}.

Optionally, in an embodiment of this application, the terminal device determines the at least one target manner of the air interface technology according to a communications protocol.

Optionally, the terminal device may alternatively determine the at least one target manner of the air interface technology in another manner.

Optionally, in an embodiment of this application, that the terminal device determines at least one target manner of an air interface technology includes: receiving, by the terminal device, a notification message sent by the network device, where the notification message carries the at least one target manner of the air interface technology, and the at least one target manner of the air interface technology is determined by the network device from at least one optional manner of the air interface technology.

Optionally, in an embodiment of this application various air interface technologies have various corresponding optional manners. Thus, when the air interface technology is a random access manner, the optional manners include: a random access manner of a long term evolution (LTE) system or a simple random access manner. When the air interface technology is an uplink waveform, the optional manners include: a cyclic prefix orthogonal frequency division multiplexing (CP-OFDM) manner or a discrete Fourier transform spread orthogonal frequency division multiplexing (DFT-S-OFDM) manner. When the air interface technology is an uplink multiple access manner, the optional manners include: a sparse code multiple access (SCMA) manner, a multi-user shared access (MUSA) manner, a low code rate spreading manner, a frequency domain spreading manner, a non-orthogonal coded multiple access (NCMA) manner, a non-orthogonal multiple access (NOMA) manner, a pattern division multiple access (PDMA) manner, a resource spread multiple access (RSMA) manner, an interleave-grid multiple access (IGMA) manner, a low density spreading with signature vector extension (LDS-SVE) manner, a low code rate and signature based shared access (LSSA) manner, a non-orthogonal coded access (NOCA) manner, an interleave division multiple access (IDMA) manner, a repetition division multiple access (RDMA) manner, or a group orthogonal coded access (GOCA) manner. When the air interface technology is a modulation scheme, the optional manner includes: a quadrature phase shift keying (QPSK) scheme, a 16 quadrature amplitude modulation 16 (QAM) scheme, a 64 quadrature amplitude modulation 64QAM scheme, a 256 quadrature amplitude modulation 256QAM scheme, a constellation mapping among subcarriers scheme, a non-uniform quadrature amplitude modulation (non-uniform QAM) scheme, a higher order modulation in conjunction with MIMO, a coded modulation scheme, a spatial modulation scheme, a scheme of mappings of bits to symbols rotated-quadrature amplitude modulation up to quadrature phase shift keying (mappings of bits to symbol(s) rotated-QAM up to QPSK), or constellation interpolation. When the air interface technology is a duplexing manner, the optional manner includes: a frequency division duplex (FDD) manner, a time division duplex (TDD) manner, a dynamic time division duplex (dynamic TDD) manner, a flexible duplex manner, a space division full-duplex manner, or an in-band full-duplex manner. When the air interface technology is an enhanced mobile broadband (eMBB) service uplink control channel coding manner, the target manner is one of the following: a polar code coding manner, a repetition coding manner, or a block coding manner. When the air interface technology is an inactive uplink data transmission manner, the optional manner includes: a grant-free transmission manner or a 2-step random access 2-step RACH manner; when the air interface technology is a subcarrier spacing, the target manner is one of the following: 15 kHz*$2^n$, where n is an integer. When the air interface technology is a slot type, the target manner is one of the following cases in which: slot duration is 7 orthogonal frequency division multiplex (OFDM) symbols or 14 orthogonal frequency division multiplex (OFDM) symbols, or mini-slot duration is m OFDM symbols, where m∈{1,6}. When the air interface technology is a transmission TTI length, the target manner is one of the following: {a downlink short TTI length: 2 OFDM symbols, an uplink short TTI length: 2 OFDM symbols}, {a downlink short TTI length: 2 OFDM symbols, an uplink short TTI length: 4 OFDM symbols}, {a downlink short TTI length: 2 OFDM symbols, an uplink short TTI length: 7 OFDM symbols}, {a downlink short TTI length: 7 OFDM symbols, an uplink short TTI length: 7 OFDM symbols}, {a downlink short TTI length: 2 OFDM symbols, an uplink short TTI length: 14 OFDM symbols}, or {a downlink short TTI length: 7 OFDM symbols, an uplink short TTI length: 14 OFDM symbols}.

It should be understood that each of the listed manners of the air interface technology is an optional manner of the air interface technology. For example, when the air interface technology is the random access manner, the optional manner includes: the random access manner of LTE or the simple random access manner. The target manner of the air interface technology is the random access manner of the LTE, or the target manner of the air interface technology is the simple random access manner.

Therefore, the terminal device can determine, from a plurality of optional manners of the air interface technology based on the notification message sent by the network device, the target manner that is of the air interface technology and that is used during actual communication, and can flexibly use a more appropriate manner of the air interface technology based on an actual communication situation, to adapt to different communication scenarios.

Optionally, in an embodiment of this application, the notification message is a system information sent by the network device, and the communicating with a network device by using the at least one target manner of the air interface includes: initially accessing the network device by using the at least one target manner of the air interface technology.

Figure 2:
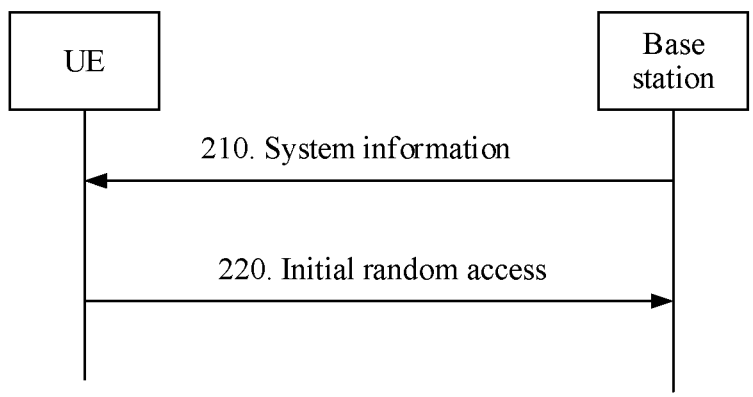
FIG. 2 is a flowchart of a method according to an embodiment of this application.

FIG. 2 is a flowchart of a method according to an embodiment of this application. As shown in FIG. 2, the method includes the following steps.

Step 210. During 210 a base station sends a system information to UE, where the system information may be sent to the UE with a broadcasting manner, and the system information carries a target manner that is of an air interface technology and that is selected by a network device.

Step 220. During 220, the UE performs an initial random access based on the target manner that is of the air interface technology and that is selected by the network device.

Specifically, for example, when a selected target manner that is of an uplink waveform and that is in the system information broadcast by the base station is discrete Fourier transform spread orthogonal frequency division multiplexing (DFT-S-OFDM), the UE performs initial random access by using the DFT-S-OFDM manner, to access the network device.

Specifically, the base station determines at least one target manner of the air interface technology from at least one optional manner of the air interface technology based on an actual communication scenario. For example, before the UE initially and randomly accesses the base station, the base station has no information about the UE, does not know a location of the UE currently located in a cell, and does not know how an environment in which the UE is located is. Therefore, the base station selects a waveform manner with strongest robustness for the UE, that is, the DFT-S-OFDM manner.

Therefore, a terminal device can determine, from the plurality of optional manners of the air interface technology based on the notification message sent by the network device, a target manner that is of the air interface technology and that is used during initial access to a system, and can flexibly use a more appropriate manner of the air interface technology based on an actual communication situation, to adapt to different communication scenarios.

Optionally, in an embodiment of this application, the notification message is an initial random access message 2, and the communicating with the network device by using the at least one target manner of the air interface technology includes: sending a message 3 of the initial random access to the network device by using the at least one target manner of the air interface technology.

It should be understood that based on the initial random access message 2, not only the at least one target manner that is of the air interface technology and that is applied to the message 3 of the initial random access can be determined, but also a target manner that is of the air interface technology and that is subsequently used during signaling interaction or data exchange with the network device can be specified. This is not limited in this application.

Figure 3:
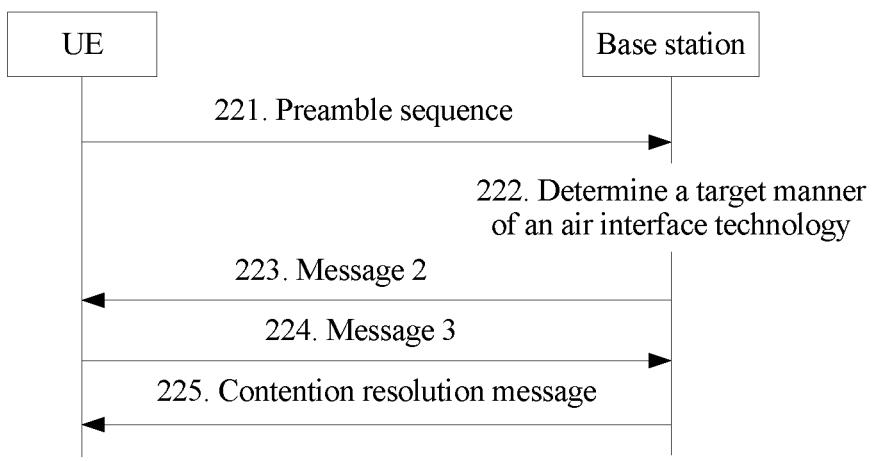
FIG. 3 is a schematic flowchart of a method according to an embodiment of this application.

Specifically, FIG. 3 is a schematic flowchart of a method according to an embodiment of this application. It should be understood that the procedure may also be considered as a further elaboration of step 220 in FIG. 2. As shown in FIG. 3, the method includes the following steps.

Step 221. During 221, the UE sends a preamble sequence (preamble) to the base station. It should be understood that the UE may use the method of the embodiment shown in FIG. 2 to determine a target manner of the air interface technology for initial random access, to send the preamble sequence. The preamble sequence is an initial random access message 1.

Step 222. During 222, the base station determines a target manner of the air interface technology. To be specific, the network device may reselect, based on a change status of a network environment, a transmission service, and the like, the target manner that is of the air interface technology and that is used by the UE to communicate with the base station. In other words, the base station further determines at least one target manner of the air interface technology from at least one optional manner of the air interface technology based on a current communication scenario.

Step 223. During 223, the base station sends a message 2 of the initial random access to the UE, where the message 2 of the initial random access carries at least one target manner of the air interface technology. In other words, the base station notifies the UE of the at least one target manner of the air interface technology by using the message 2, so that the UE subsequently transmits data or signaling based on the at least one target manner that is of the air interface technology and that is carried in the message 2.

Step 224. During 224, the UE sends a message 3 to the base station. To be specific, the UE sends the message 3 to the base station by using the at least one target manner that is of the air interface technology and that is selected by the base station.

It should be understood that, if an initial random access manner of the UE is an existing LTE four-step random access manner, based on a preamble identity (preamble ID) in the message 2, all UEs that use the preamble in the message 1 receive the message 2. In other words, these UEs all receive the target manner that is of the air interface technology and that is reselected by the base station. In this case, these UEs all perform subsequent transmission based on the option reselected by the base station. If an initial random access of the UE is a simplified 2-step random access manner, the message 1 carries an identifier of the UE. In this case, the message 2 is sent only to the UE corresponding to the identifier carried in the message 1. To be specific, only the UE receives the target manner that is of the air interface technology and that is reselected by the base station, and performs subsequent transmission based on the option reselected by the base station.

Optionally, in an embodiment of this application, the at least one target manner that is of the air interface technology and that is carried in the message 2 of the initial random access includes a manner of an uplink waveform, and the sending message 3 of the initial random access to the network device by using the at least one target manner of the air interface technology includes: determining an RB allocation field content value in the message 2 of the initial random access; determining a resource location of the message 3 of the initial random access depending on whether the manner of the uplink waveform is discrete Fourier transform spread orthogonal frequency division multiplexing (DFT-S-OFDM) or cyclic prefix orthogonal frequency division multiplexing (CP-OFDM), where a resource location of the message 3 of the initial random access that is determined when the manner of the uplink waveform is the DFT-S-OFDM is different from a resource location of the message 3 of the initial random access that is determined when the manner of the uplink waveform is the CP-OFDM; and sending the message 3 of the initial random access to the network device at the determined resource location.

To be specific, the UE determines the resource location of the message 3 of the initial random access depending on whether the manner of the uplink waveform is the DFT-S-OFDM or the CP-OFDM and based on the RB allocation field content value in an uplink grant (UL grant) in the message 2 when the RB allocation field content value is a specified value. Generally, a resource location of the message 3 varies according to a manner of the uplink waveform. This is because the DFT-S-OFDM always indicates consecutive resources in frequency domain, and the CP-OFDM may indicate non-consecutive resources in frequency domain.

Step 225. During 225, the base station sends a contention resolution message to the UE, namely, an initial random access message 4.

Further, the UE performs subsequent data transmission and/or signaling transmission with the base station based on the target manner that is of the air interface technology and that is reselected by the base station.

When the air interface technology is the uplink waveform, the optional manner includes the CP-OFDM and the DFT-S-OFDM. In this case, the base station can determine, based on the message 1, a cell in which the UE is currently located. If the UE is in a small cell, the base station determines a waveform manner of the CP-OFDM for the UE to use. If the UE is in a large cell, the base station can roughly determine, based on signal quality of the message 1, whether the UE is in a central region or an edge region of the large cell. If the UE is in the central region, the base station determines a waveform manner of the CP-OFDM for the UE to use. If the UE is in the edge region, of the base station determines a waveform manner of the DFT-S-OFDM for the UE to use.

Therefore, the terminal device can determine, from the plurality of optional manners of the air interface technology based on the notification message sent by the network device, a target manner that is of the air interface technology and that is used during initial random access to a system, and can flexibly use a more appropriate manner of the air interface technology based on an actual communication situation, to adapt to different communication scenarios.

Optionally, in an embodiment of this application, the network device is a target network device to which the terminal device expects to be handed over, and the notification message is an HO command.

To be specific, when a source network device accessed by the UE determines that the UE is to be handed over to the target network device and sends a handover request message to the target network device, and the target network device allows the request, the target network device sends the HO command message to the UE. The message carries the at least one target manner that is of the air interface technology and that is selected by the target network device.

In other words, specifically, when the source base station determines, based on a measurement report of the UE, that the UE is to be handed over to the target base station, the source base station sends the handover request message to the target network device. If the target network device allows the request, before the UE is handed over to the target base station, the target base station selects the at least one target manner of the air interface technology from the at least one optional manner of the air interface technology based on information such as UE capability information and a measurement result of the UE in the received handover request message, and notifies the UE by using the HO command message.

For example, if the target base station determines, based on the UE capability information and the measurement result of the UE in the received handover request message, to hand over the UE to a small cell served by the target base station, the target base station determines, for the UE, to use the waveform manner of the CP OFDM in the target cell. If the target base station determines to hand over the UE to a large cell served by the target base station, the target base station determines, for the UE, to use the waveform manner of the DFT-S-OFDM with strongest robustness in the target cell.

Figure 4:
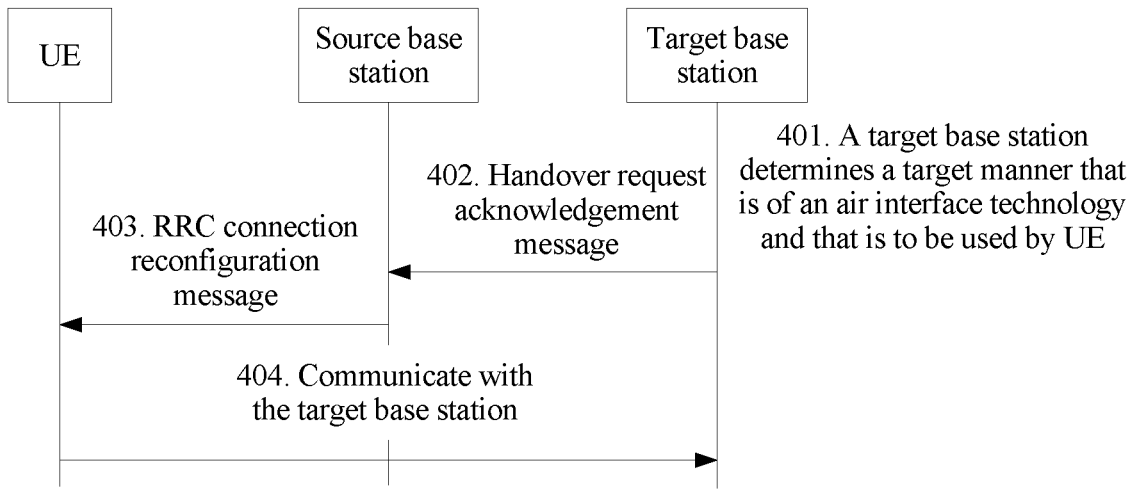
FIG. 4 is a flowchart of a method according to an embodiment of this application.

FIG. 4 is a flowchart of a method according to an embodiment of this application. Referring to FIG. 4, FIG. 4 shows in detail an interaction process between UE and each of a source base station and a target base station in a handover process, including the following steps.

Step 401. During 401, the target base station determines a target manner that is of an air interface technology and that is to be used by the UE.

Step 402. During 402, the target base station sends a handover request acknowledgement message to the source base station, where the handover request acknowledgement message carries an HO command, and the HO command can be used to indicate the target manner that is of the air interface technology and that is selected by the target base station.

Step 403. During 403, the source base station sends an RRC connection reconfiguration message to the UE, where the connection reconfiguration message also carries the foregoing HO command.

Step 404. During 404, the UE communicates with the target base station, and uses the target manner that is of the air interface technology and that is selected by the target base station.

Therefore, a terminal device can determine, from a plurality of optional manners of the air interface technology based on a notification message sent by a network device, a target manner that is of the air interface technology and that is used during handover to the network device, and can flexibly use a more appropriate manner of the air interface technology based on an actual communication situation, to adapt to different communication scenarios.

Optionally, in an embodiment of this application, after the terminal device initially and randomly accesses the network device, the notification message is one of the following messages: a physical layer message, a MAC message, or an RRC message.

In other words, regardless of a manner used by the UE, after the UE initially and randomly accesses the network device, the base station may re-determine, based on a capability of the UE and/or an environment in which the UE is located, a manner that is of the air interface technology and that is to be used by the UE.

Figure 5:
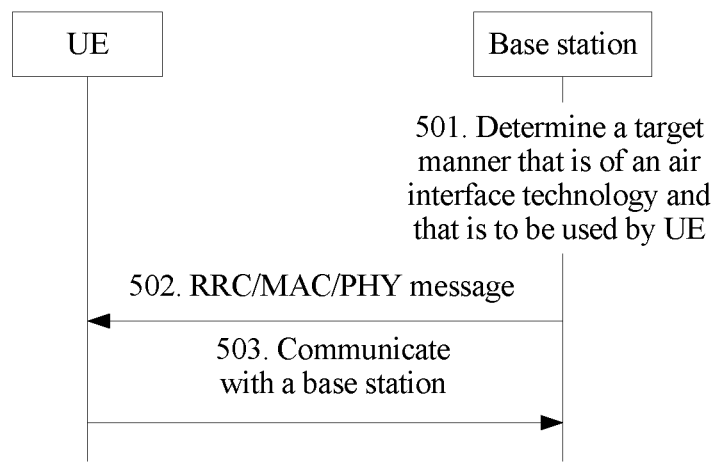
FIG. 5 is a schematic flowchart of a method according to an embodiment of this application.

Specifically, FIG. 5 is a schematic flowchart of a method according to an embodiment of this application. FIG. 5 shows that after the UE initially and randomly accesses a network device, the network device reselects a target manner of an air interface technology and delivers the target manner of the air interface technology to the UE, and the UE communicates with the network device based on the target manner of the air interface technology. As shown in FIG. 5, the method includes the following steps.

Step 501. During 501, a base station determines a target manner that is of an air interface technology and that is to be used by UE.

Step 502. During 502, the base station sends one of the following messages to the UE: a PHY message, a MAC message, or an RRC message. Regardless of a type of message specifically sent by the base station to the UE, the message carries at least one target manner that is of the air interface technology and that is selected by the base station for the UE.

Step 503. During 503, the UE communicates with the network device.

Therefore, a terminal device can determine, from a plurality of optional manners of the air interface technology based on a notification message sent by the network device, a target manner that is of the air interface technology and that is used during communication with the network device, and can flexibly use a more appropriate manner of the air interface technology based on an actual communication situation, to adapt to different communication scenarios.

Optionally, in an embodiment of this application, the determining, by a terminal device, at least one target manner of an air interface technology includes: selecting, by the terminal device, the at least one target manner of the air interface technology from the at least one optional manner of the air interface technology according to an air interface technology selection policy.

In other words, the terminal device may perform selection from the at least one optional manner of the air interface technology according to the air interface technology selection policy, and communicate with the network device by using the selected at least one target manner of the air interface technology.

It should be understood that the UE may select a target manner of the air interface technology from the at least one optional manner of the air interface technology according to the air interface technology selection policy and based on information such as a current network environment, a capability of the UE, and a service that needs to be transmitted.

Optionally, in an embodiment of this application, when the UE needs to report eMBB service uplink control information, the UE determines a to-be-used coding manner based on a condition that needs to be met by a length of the uplink control information that needs to be reported. A specific procedure is as follows: The base station broadcasts, in a system information, a length threshold of uplink control information using a polar code, or specifies, in a protocol, a length threshold of uplink control information using a polar code. When the length of the uplink control information that needs to be reported by the UE is greater than the threshold, the UE uses the polar code to perform channel coding on the uplink control information, and then performs transmission. Otherwise, the UE uses another manner. When the UE needs to report the eMBB service uplink control information, the UE selects an appropriate channel coding manner based on the length of the uplink control information that needs to be reported. The UE performs channel coding on the uplink control information by using the coding manner, and then performs transmission. It should be understood that the base station reversely deduces the channel coding manner by using received data information.

Optionally, in an embodiment of this application, when the UE in an inactive mode needs to transmit uplink data, a to-be-used transmission manner is determined based on an environment in which the UE is currently located and based on a condition that needs to be met by a data volume of the uplink data that needs to be transmitted. The base station broadcasts, in a system information, a condition for using a grant-free transmission manner, or specifies, in a protocol, a condition for using a grant-free transmission manner, for example, based on a path loss threshold of a cell downlink signal, depending on whether the UE still remains in a cell in which the UE in the inactive mode (a third mode) is located, or based on a threshold of an uplink data volume that needs to be transmitted by the UE. If a path loss that is of the cell downlink signal and that is detected by the UE is less than a specified threshold, or the UE still remains in the cell in which the UE in the inactive mode is located, and the uplink data that needs to be transmitted by the UE is less than a specified threshold, the grant-free transmission manner is used. Otherwise, a 2-step RACH manner is adopted. When the UE in the inactive mode needs to transmit uplink data, an appropriate uplink data transmission manner is selected based on an environment in which the UE is currently located and a data volume of the uplink data that needs to be transmitted. The UE transmits the uplink data by using the determined transmission manner.

It should be understood that there may be different air interface technology selection policies for different application scenarios. This is not limited in this embodiment of this application.

Optionally, in an embodiment of this application, the foregoing method further includes: receiving, by the terminal device, a system information sent by the network device, where the system information carries the air interface technology selection policy.

It should be understood that, the air interface technology selection policy may further carry a plurality of air interface technologies and optional manners of each air interface technology, so that the UE selects the target manner of the air interface technology according to the air interface technology policy.

In other words, the UE may select the target manner of the air interface technology according to a communications protocol or an air interface technology policy delivered by the base station.

Optionally, in an embodiment of this application, the communicating with the network device by using the at least one target manner of the air interface technology includes: sending a selection notification message to the network device, where the selection notification message is used to indicate that the terminal device is to communicate with the network device by using the at least one target manner.

To be specific, after selecting the target manner of the air interface technology, the UE needs to notify the network device of the selected manner of the air interface technology.

Figure 6:
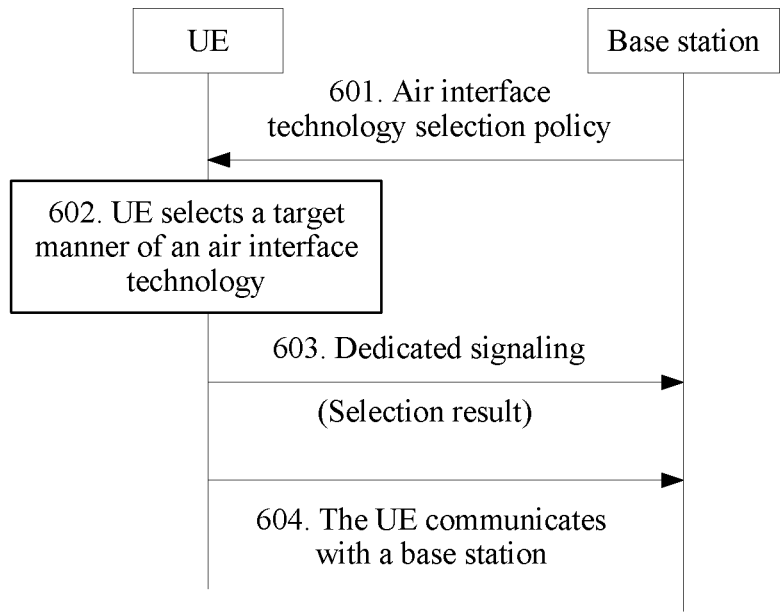
FIG. 6 is a schematic flowchart of a method according to an embodiment of this application.

Specifically, FIG. 6 is a schematic flowchart of a method according to an embodiment of this application. As shown in FIG. 6, the method includes the following steps.

Step 601. During 601 the base station sends an air interface technology selection policy to UE.

Step 602. During 602, the UE selects a target manner of an air interface technology from optional manners of the air interface technology according to the air interface technology selection policy and based on information such as a current network environment, a capability of the UE, and a service that needs to be transmitted.

Step 603. During 603, the UE sends a notification message to a base station by using dedicated information, where the notification message carries the target manner that is of the air interface technology and that is selected by the UE.

Step 604. During 604, the UE communicates with the base station by using the selected target manner of the air interface technology.

Therefore, a terminal device can determine, from the plurality of optional manners of the air interface technology based on the notification message sent by a network device, the target manner that is of the air interface technology and that is used during communication with the network device, and can flexibly use a more appropriate manner of the air interface technology based on an actual communication situation, to adapt to different communication scenarios.

Figure 7:
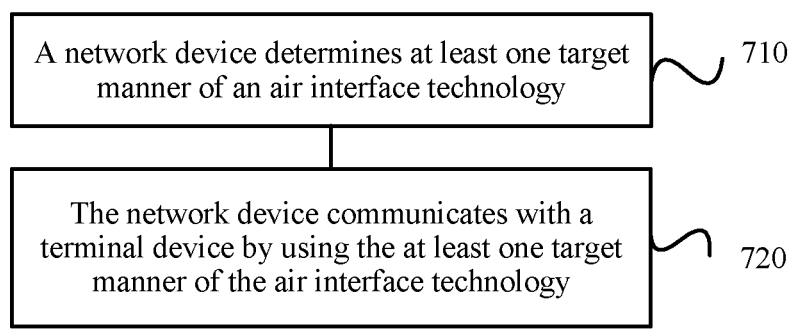
FIG. 7 is a schematic flowchart of a method according to another embodiment of this application.

FIG. 7 is a schematic flowchart of a method according to another embodiment of this application. The method may be performed by a network device. For example, the network device may be a base station. As shown in FIG. 7, the method 700 includes the following steps.

Step 710. During 710, the network device determines at least one target manner of an air interface technology.

Step 720. During 720, the network device communicates with a terminal device by using the at least one target manner of the air interface technology.

It should be understood that the at least one target manner of the air interface technology is the same as the target manner of the air interface technology in the embodiment shown in FIG. 1. Details are not described herein again.

Therefore, according to the method provided in this embodiment of this application, a target manner that is of an air interface technology and that is used during actual communication can be determined from a plurality of optional manners of the air interface technology.

Optionally, in an embodiment of this application, the determining, by the network device, at least one target manner of an air interface technology includes: determining, by the network device, the at least one target manner of the air interface technology from at least one optional manner of the air interface technology; and sending, by the network device, a notification message to the terminal device, where the notification message carries the at least one target manner of the air interface technology.

Optionally, in an embodiment of this application, the notification message is a system information, so that the terminal device initially and randomly accesses the network device by using the at least one target manner of the air interface technology.

Optionally, in an embodiment of this application, the notification message is an initial random access message 2, so that the terminal device sends a message 3 of the initial random access to the network device by using the at least one target manner of the air interface technology.

Optionally, in an embodiment of this application, the network device is a target network device to which the terminal device expects to be handed over, and the notification message is an HO command message.

Optionally, in an embodiment of this application, after the terminal device accesses the network device, the notification message is one of the following messages: a physical layer message, a media access control MAC message, or a radio resource control RRC message.

Therefore, the terminal device can determine, from the plurality of optional manners of the air interface technology based on the notification message sent by the network device, the target manner that is of the air interface technology and that is used during communication with the network device, and can flexibly use a more appropriate manner of the air interface technology based on an actual communication situation, to adapt to different communication scenarios.

Procedures of the methods of the embodiments of this application are described in detail with reference to FIG. 1 to FIG. 7. The following describes in detail devices of the embodiments of this application with reference to FIG. 8 to FIG. 11.

Figure 8:
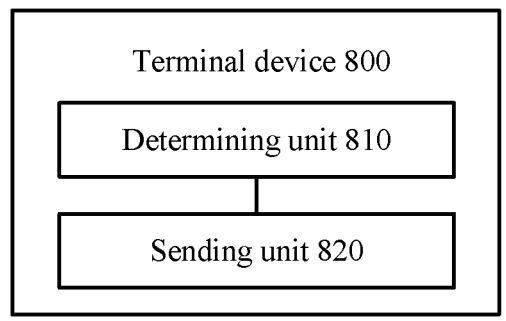
FIG. 8 is a schematic block diagram of a terminal device 800 according to an embodiment of this application.

FIG. 8 is a schematic block diagram of a terminal device 800 according to an embodiment of this application. The terminal device 800 can perform the steps that are performed by the terminal device in the methods in FIG. 1 to FIG. 7. To avoid repetition, details are not described herein again. The terminal device 800 includes: a determining unit 810, where the determining unit 810 is configured to determine at least one target manner of an air interface technology; and a sending unit 820, where the sending unit 820 is configured to communicate with a network device by using the at least one target manner of the air interface technology.

Therefore, the terminal device provided in this embodiment of this application can determine, from a plurality of optional manners of the air interface technology, the target manner that is of the air interface technology and that is used during actual communication.

Figure 9:
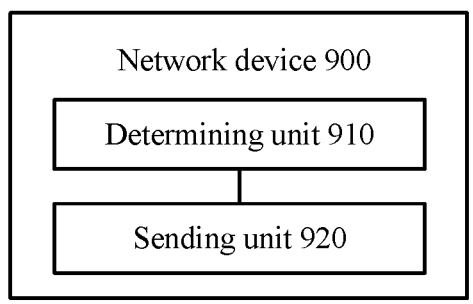
FIG. 9 is a schematic block diagram of a network device 900 according to an embodiment of this application.

FIG. 9 is a schematic block diagram of a network device 900 according to an embodiment of this application. The network device 900 can perform the steps that are performed by the network device in the methods in FIG. 1 to FIG. 7. To avoid repetition, details are not described herein again. The network device 900 includes: a determining unit 910, where the determining unit 910 is configured to determine at least one target manner of an air interface technology; and a sending unit 920, where the sending unit 920 is configured to communicate with a terminal device by using the at least one target manner of the air interface technology.

Therefore, the network device provided in this embodiment of this application can determine, from a plurality of optional manners of the air interface technology, the target manner that is of the air interface technology and that is used during actual communication.

Figure 10:
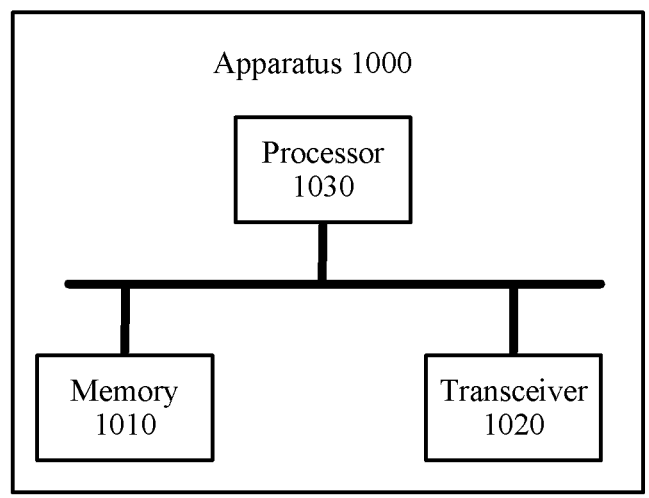
FIG. 10 is a schematic structural block diagram of an apparatus 1000 according to another embodiment of this application.

FIG. 10 is a schematic structural block diagram of an apparatus 1000 according to another embodiment of this application. It should be understood that the apparatus 1000 can perform the steps that are performed by the terminal device in the methods in FIG. 1 to FIG. 7. To avoid repetition, details are not described herein again. The apparatus 1000 includes: a memory 1010, configured to store an instruction; a transceiver 1020, configured to communicate with another device; and a processor 1030, where the processor 1030 is connected to the memory 1010 and the transceiver 1020, and configured to execute the instruction stored in the memory 1010, to perform the following steps when executing the instruction: determining at least one target manner of an air interface technology; and communicating, by the terminal device, with the network device by using the at least one target manner of the air interface technology.

Therefore, the apparatus provided in this embodiment of this application can determine, from a plurality of optional manners of the air interface technology, the target manner that is of the air interface technology and that is used during actual communication.

Figure 11:
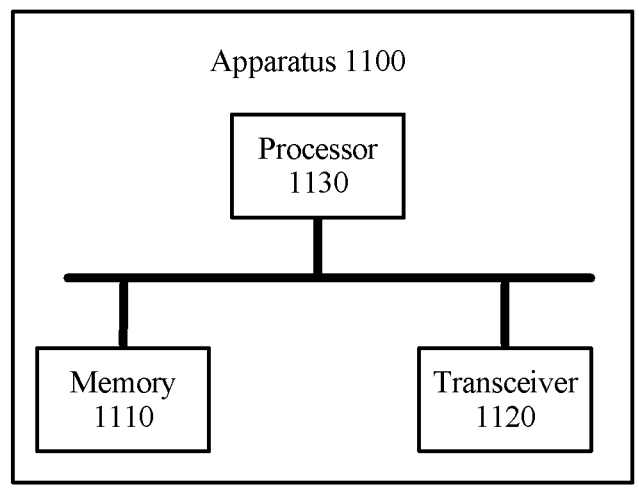
FIG. 11 is a schematic structural block diagram of an apparatus 1100 according to another embodiment of this application.

FIG. 11 is a schematic structural block diagram of an apparatus 1100 according to another embodiment of this application. It should be understood that the apparatus 1100 can perform the steps that are performed by a network device in the methods in FIG. 1 to FIG. 7. To avoid repetition, details are not described herein again. The apparatus 1100 includes: a memory 1110, configured to store an instruction; a transceiver 1120, configured to communicate with another device; and a processor 1130, configured to execute the instruction in the memory 1110, where the processor 1130 is connected to the memory 1110 and the transceiver 1120, and configured to execute the instruction stored in the memory 1110, to perform the following steps when executing the instruction: determining at least one target manner of an air interface technology; and communicating with a terminal device by using the at least one target manner of the air interface technology.

Therefore, the apparatus provided in this embodiment of this application can determine, from a plurality of optional manners of the air interface technology, the target manner that is of the air interface technology and that is used during actual communication.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, reference may be made to a corresponding process in the method embodiments for a detailed working process of the system, apparatus, and unit. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the present invention shall be subject to the protection scope of the claims.

What is claimed is:

1. A communication method carried out by a terminal device, the method comprising:

receiving a system information broadcast by a network device, wherein the system information carries an information indicating a first target manner of an uplink waveform of an air interface technology for a message 3, and wherein the first target manner of an uplink waveform is determined by the network device from at least one optional manner of the air interface technology;

sending, after receiving the system information, the message 3 by using the first target manner of the uplink waveform to the network device;

receiving a radio resource control (RRC) message from the network device, wherein the RRC message carries an information indicating a second target manner of an uplink waveform of an air interface technology, and wherein the second target manner of an uplink waveform is determined by the network device from at least one optional manner of the air interface technology; and communicating, after receiving the RRC message, with the network device by using the second target manner of the uplink waveform.

2. The method according to claim 1, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

3. The method according to claim 1, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

4. A communication apparatus, comprising:

a non-transitory computer-readable memory comprising computer-executable instructions; and a processor in communication with the memory, wherein the processor is configured to execute the computer-executable instructions to carry out a communication method comprising:

receiving a system information broadcast by a network device, wherein the system information carries an information indicating a first target manner of an uplink waveform of an air interface technology for a message 3, and wherein the first target manner of an uplink waveform is determined by the network device from at least one optional manner of the air interface technology;

sending, after receiving the system information, the message 3 by using the first target manner of the uplink waveform to the network device;

receiving a radio resource control (RRC) message from the network device, wherein the RRC message carries an information indicating a second target manner of an uplink waveform of an air interface technology, and wherein the second target manner of an uplink waveform is determined by the network device from at least one optional manner of the air interface technology; and communicating, after receiving the RRC message, with the network device by using the second target manner of the uplink waveform.

5. The apparatus according to claim 4, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

6. The apparatus according to claim 4, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

7. A non-transitory memory storage medium comprising computer-executable instructions that, when executed, facilitate a terminal device carrying out a communication method comprising:

receiving a system information broadcast by a network device, wherein the system information carries an information indicating a first target manner of an uplink waveform of an air interface technology for a message 3, and wherein the first target manner of an uplink waveform is determined by the network device from at least one optional manner of the air interface technology;

sending, after receiving the system information, the message 3 via the first target manner of the uplink waveform to the network device;

receiving a radio resource control (RRC) message from the network device, wherein the RRC message carries an information indicating a second target manner of an uplink waveform of an air interface technology, and wherein the second target manner of an uplink waveform is determined by the network device from at least one optional manner of the air interface technology; and communicating, after receiving the RRC message, with the network device by using the second target manner of the uplink waveform.

8. The non-transitory memory storage medium according to claim 7, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

9. The non-transitory memory storage medium according to claim 7, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

10. A communication method carried out by a network device, comprising:

broadcasting to a terminal device, a system information that carries an information indicating a first target manner of an uplink waveform of an air interface technology for a message 3, and wherein the first target manner of an uplink waveform is determined by the network device from at least one optional manner of the air interface technology;

receiving, from the terminal device after the broadcasting, the message 3 via the first target manner of the uplink waveform;

sending a radio resource control (RRC) message to the terminal device, wherein the RRC message carries an information indicating a second target manner of an uplink waveform of an air interface technology, and wherein the second target manner of an uplink waveform is determined by the network device from at least one optional manner of the air interface technology; and communicating, after the sending, with the terminal device by using the second target manner of the uplink waveform.

11. The method according to claim 10, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

12. The method according to claim 10, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

13. A communication apparatus, comprising:
a non-transitory computer-readable memory comprising computer-executable instructions; and
a processor in communication with the memory, wherein the processor is configured to execute the computer-executable instructions to carry out a communication method comprising:
broadcasting, to a terminal device, a system information that carries an information indicating a first target manner of an uplink waveform of an air interface technology for a message 3, and wherein the first target manner of an uplink waveform is determined by the network device from at least one optional manner of the air interface technology;
receiving, from the terminal device after the broadcasting, the message 3 via the first target manner of the uplink waveform;
sending a radio resource control (RRC) message to the terminal device, wherein the RRC message carries an information indicating a second target manner of an uplink waveform of an air interface technology, and wherein the second target manner of an uplink waveform is determined by the network device from at least one optional manner of the air interface technology; and
communicating, after the sending, with the terminal device by using the second target manner of the uplink waveform.

14. The method according to claim 13, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

15. The method according to claim 13, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

16. A non-transitory memory storage medium comprising computer-executable instructions that, when executed, facilitate a network device carrying out a communication method comprising:
broadcasting, to a terminal device, a system information that carries an information indicating a first target manner of an uplink waveform of an air interface technology for a message 3, and wherein the first target manner of an uplink waveform is determined by the network device from at least one optional manner of the air interface technology;
receiving, from the terminal after the broadcasting, the message 3 via the first target manner of the uplink waveform;
sending a radio resource control (RRC) message to the terminal device, wherein the RRC message carries an information indicating a second target manner of an uplink waveform of an air interface technology, and wherein the second target manner of an uplink waveform is determined by the network device from at least one optional manner of the air interface technology; and
communicating, after the sending, with the terminal device by using the second target manner of the uplink waveform.

17. The method according to claim 16, wherein the first target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

18. The method according to claim 16, wherein the second target manner is one of the group consisting of: a cyclic prefix orthogonal frequency division multiplexing (CP-OFDM) manner, and a discrete Fourier transform spread orthogonal frequency division multiplexing (DFT-S-OFDM) manner.

* * * * *

UNITED STATES PATENT AND TRADEMARK OFFICE
CERTIFICATE OF CORRECTION

PATENT NO. : 11,071,146 B2
APPLICATION NO. : 16/503206
DATED : July 20, 2021
INVENTOR(S) : Wang et al.

Page 1 of 1

It is certified that error appears in the above-identified patent and that said Letters Patent is hereby corrected as shown below:

In the Claims

Claim 14: Column 23, Line 47: "The method according to claim 13, wherein the first" should read
-- The apparatus according to claim 13, wherein the first --.

Claim 15: Column 24, Line 5: "The method according to claim 13, wherein the second" should read
-- The apparatus according to claim 13, wherein the second --.

Claim 17: Column 24, Line 36: "The method according to claim 16, wherein the first" should read
-- The non-transitory memory storage medium according to claim 16, wherein the first --.

Claim 18: Column 24, Line 42: "The method according to claim 16, wherein the second" should read
-- The non-transitory memory storage medium according to claim 16, wherein the second --.

Signed and Sealed this
Seventh Day of February, 2023

Katherine Kelly Vidal
*Director of the United States Patent and Trademark Office*